Dec. 25, 1951  H. S. ROWDON  2,580,130
FISHING REEL HOLDER
Filed Oct. 25, 1948

Inventor:
Horace S. Rowdon.
By Fetherstonhaugh & Co
his Atty's.

Patented Dec. 25, 1951

2,580,130

UNITED STATES PATENT OFFICE 2,580,130

FISHING REEL HOLDER

Horace S. Rowdon, St. Vital, Manitoba, Canada

Application October 25, 1948, Serial No. 56,360

1 Claim. (Cl. 43—21.2)

My invention relates to new and useful improvements in angling equipment, an object of the invention being to provide a device of the character herewithin described which provides adequate supporting means for a fishing rod or reel on the gunwale, transom or seat of a boat.

A further object of my invention is to provide a device of the character herewithin described the use of which permits the angler to operate the oars or motor of the boat and at the same time provides adequate support for the rod or reel used for trolling.

Another object of my invention is to provide a device of the character herewithin described wherein the associated fishing rod may be rapidly attached and detached from the clamp.

A still further object of my invention is to provide a device of the character herewithin described which is economical in manufacture, simple in construction, and which is otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

In the art of fishing, particularly in lakes or the like, the method commonly called trolling is extremely popular. In trolling the boat is propelled slowly through the water by means of oars or the like while a line, with a spinner or bait attached thereto, is drawn therebehind. This line may be attached to a reel or rod and necessitates a person to control same as well as someone to keep the boat moving, as it will be appreciated that unless the spinner or bait is kept in a continual state of forward motion it will merely sink to the bottom.

Many occasions arise when a second party is unobtainable to provide the necessary propulsion for the boat, consequently the fishing expedition has to be postponed, and the need has long been felt for the provision of a clamp or the like to support the rod or reel while the fisherman supplies the means of propulsion. There have been many expensive and intricate supporting clamps devised in the past, but the most of these have been designed for use with a conventional fishing rod having the reel attached thereto.

Consequently I have designed the clamp hereinafter to be described which is adaptable for use with either a rod or reel and which incorporates means whereby the rod may be quickly detached and attached to the clamp, this being an important requirement in order to obtain rapid control when a fish strikes.

Figure 2:
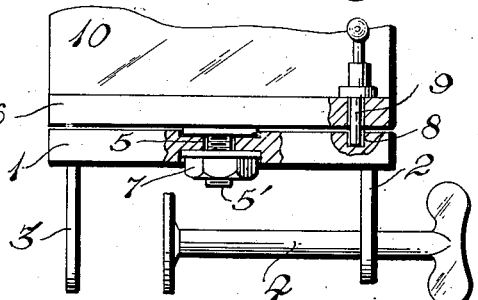
Figure 2 is a fragmentary section of the anchor plate, and rotatably mounted base plate of my device.

Proceeding therefore to describe my invention in detail, it will be seen upon reference to the accompanying drawings that I have provided a circular anchor plate 1 to the underside of which is rigidly attached the conventional clamping means 2 comprising the flanges 3 and the screw-threaded wing bolt 4 by which the device may be attached to the gunwale, transom or seat of the boat as will hereinafter be described. The anchor plate 1 is centrally drilled as at 5 to receive the bolt 5' which is rigidly attached as by welding to the underside of a base plate 6. The nut 7 connects the two plates together concentrically as clearly shown in Figure 2 of the accompanying drawings, and it should be noted that this connection is relatively loose, thus permitting rotation of the base plate 6 upon the anchor plate for the purpose hereinafter to be described.

A series of vertical drillings 8 is provided adjacent the circumference of the anchor plate 1 selectively engageable by a spring loaded plunger 9 extending downwardly from the aforementioned rotatable base plate 6 in order to lock the plates in any desired position.

Figure 1:
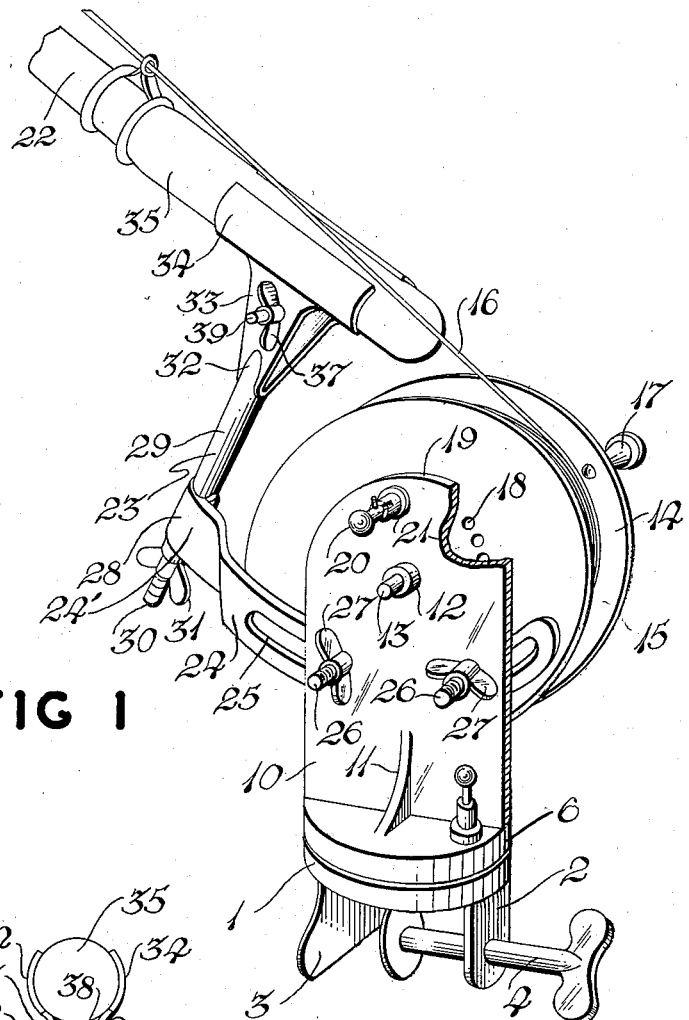
Figure 1 is a perspective view of my device sectioned in part to show the construction thereof.

The reel supporting component 10 extends vertically from the base plate 6 being rigidly attached thereto by means of the webs 11 as clearly shown in Figure 1, and is provided with the drilled shoulder or bushing 12 substantially towards the upper end thereof which provides support in the form of a bearing to the transversely extending reel spindle 13. A reel 14 including two side plates 15 held in parallel spaced relationship by means of a sheave (not illustrated) is mounted for rotation upon the spindle 13, the fishing line 16 being contained between the two plates 15 in the conventional manner. The outboard side plate is provided with an offstanding winding handle 17 by which the line may be retracted or extended as required. The inner side plate 15 is provided with a set of concentrically and annularly spaced apertures 18 on a radius slightly less than that of the upper curved edge 19 of the aforementioned supporting component 10. These apertures are selectively engageable by a spring loaded plunger 20 mounted within the relatively small shoulder bearing 21 situated adjacent the upper edge 19 in order to restrain the reel from unwinding during the trolling operation. In this connection it is to be appreciated that the spring loading of the plunger 20 causes the plunger normally to be in engagement with one of the apertures 18 unless it is manually held outwardly therefrom during the reeling operation.

If it is desired to use an associated rod 22 with the reel 14, then the rod support collectively designated 23 may be utilized. This comprises the bracket 24 provided with the arcuate slot 25 engageable by two bolts 26 coacting with the component 10, the desired position of the bracket 24 being controlled by the wing nuts 27 as will hereinafter become apparent. The vertical sleeve 28 is formed upon the distal end 24' of the bracket 24 and receives the tapered rod carrying component 29 adjustably connected thereto by the screw-threaded end 30 thereof in association with the wing nut 31. The uppermost end of the rod 29 is provided with the bifurcated fork 32 within which is rigidly attached a pair of substantially triangular, resilient plates 33 manufactured preferably from spring steel and designed to exert a bias normally away from one another for the reason which will hereinafter become apparent.

The plates 33 are provided with longitudinally extending rod handle-embracing clamps 34 which should be curved slightly to complement the configuration of a conventional fishing rod handle 35 normally receivable therebetween. I have provided the novel adjusting and quick release means collectively designated 36 which in this embodiment comprises the wing nut 37 attached to the relatively short, internally screw-threaded sleeve 38 rotatably attached through one of the aforementioned plates 33. A screw-threaded shank 39 is engageable with the sleeve and extends through the opposite plate. The outboard end 40 of this shank is bifurcated to receive the rotating cam-lever 41 pivotally attached to the rod by means of the pin 42 and provided with the riser portion 43 by which inward pressure is exerted upon the jaws 33.

Figure 3:
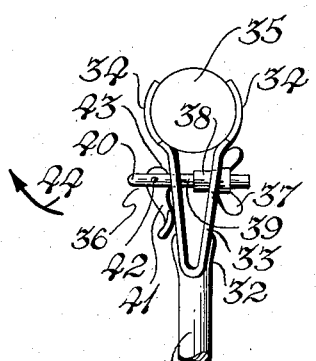
Figure 3 is a fragmentary end view of the rod handle-embracing clamps.

Having therefore described by invention in detail, its method of application will now be presented. The device is fastened to the gunwale, transom or seat of the boat by means of the clamp 2 and the base plate 6 is positioned and locked by the aforementioned spring loaded plunger 9. If it is desired to use the reel 14 only, then the spring loaded plunger 20 is withdrawn and the line 16 extended to the required length whereupon the plunger 20 may be released engaging with one of the apertures 18 thus arresting the reel in this position. If however it is desired to use the associated rod 22 in conjunction with the reel 14, then the bracket 24 should first be positioned to give the correct vertical angle for the rod, next, the rod carrying component 29 is rotated within the sleeve 28 until the desired horizontal angle is obtained. It is to be appreciated that these adjustments will be necessary in order to set the rod 22 at the desired relation to the boat which will depend upon whether the device is used clamped to the seat or the gunwale of the boat. The handle 35 of the rod or rod itself forward of the handle may now be placed between the clamps 34 and the wing nut 37 tightened sufficiently to permit the rod to be removed and replaced freely. The lever 41 is now rotated in the direction of the arrow 44 thus causing the riser portion 43 to bear against the adjacent plate 33, the cam action forcing the clamps together thereby holding the rod firmly therebetween. The line 16 is now extended to the desired length as hereinbefore described and the reel locked in position by means of the spring loaded plunger 20. From the foregoing it will be appreciated that the rod 22 can rapidly be disengaged from the clamps 34 simply by moving the lever 41 to the position shown in Figure 3 of the accompanying drawings whereupon the clamps 34 can be sprung apart sufficiently to allow the removal of the rod.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A fishing reel holder for use in trolling or the like and in combination with an anchor plate with clamp means attached thereto, a base plate mounted for rotation upon said anchor plate, a reel supporting component upstandingly attached to said base plate, a reel mounted for rotation upon said supporting component and means extending through the reel supporting component for releasing and arresting the rotation of said reel; a rod support, a rod in said support, said rod support comprising an arcuately slotted bracket adjustably connected to the reel supporting component, and a rod carrying component mounted upon the distal end of said bracket.

HORACE S. ROWDON.

REFERENCES CITED

The following references are of record in the file of this patent:

UNITED STATES PATENTS

| Number | Name | Date |
|---|---|---|
| D. 136,856 | Olowecki | Dec. 14, 1943 |
| 83,740 | Stetson | Nov. 3, 1868 |
| 374,737 | Geils | Dec. 13, 1887 |
| 610,880 | Perkins | Sept. 13, 1898 |
| 952,812 | Jorgensen | Mar. 22, 1910 |
| 2,243,388 | Magyarosi | May 27, 1941 |
| 2,333,632 | Benson | Nov. 9, 1943 |
| 2,430,112 | Hamre | Nov. 4, 1947 |
| 2,483,012 | Koon | Sept. 27, 1949 |